(12) United States Patent
Gudjonsson

(10) Patent No.: US 7,395,934 B2
(45) Date of Patent: Jul. 8, 2008

(54) BATCHING WITH FEEDBACK CORRECTION

(75) Inventor: Petur Gudjonsson, Reykjavik (IS)

(73) Assignee: Marel HF, Garabaer (IS)

( * ) Notice: Subject to any disclaimer, the term of this patent is extended or adjusted under 35 U.S.C. 154(b) by 555 days.

(21) Appl. No.: 10/504,293

(22) PCT Filed: Feb. 13, 2003

(86) PCT No.: PCT/IS03/00008

§ 371 (c)(1),
(2), (4) Date: Jan. 18, 2005

(87) PCT Pub. No.: WO03/069285

PCT Pub. Date: Aug. 21, 2003

(65) Prior Publication Data

US 2005/0131567 A1 Jun. 16, 2005

(30) Foreign Application Priority Data

Feb. 13, 2002 (IS) .......................................... 6268

(51) Int. Cl.
*B07C 5/32* (2006.01)
*G01G 13/00* (2006.01)

(52) U.S. Cl. ..................... 209/592; 209/645; 177/25.18

(58) Field of Classification Search ................. 209/592, 209/596, 645; 177/25.18, 25.19
See application file for complete search history.

(56) References Cited

U.S. PATENT DOCUMENTS

| 4,413,739 | A | | 11/1983 | Kohashi | |
|---|---|---|---|---|---|
| 4,499,961 | A | * | 2/1985 | Fukuda | 177/25.18 |
| 5,760,342 | A | * | 6/1998 | Takeda et al. | 177/25.18 |
| 5,998,740 | A | * | 12/1999 | Kvisgaard et al. | 177/25.18 |
| 6,321,135 | B1 | | 11/2001 | Asgeirsson | |
| 6,373,001 | B1 | * | 4/2002 | Kono et al. | 177/25.18 |
| 7,258,237 | B2 | * | 8/2007 | Nielsen | 209/645 |

FOREIGN PATENT DOCUMENTS

| GB | 2 116 732 A | 9/1983 |
|---|---|---|
| WO | 00/00036 A | 1/2000 |

* cited by examiner

*Primary Examiner*—Joseph C Rodriguez
(74) *Attorney, Agent, or Firm*—Nixon & Vanderhye P.C.

(57) ABSTRACT

A method and apparatus are disclosed for automatically batching objects into portions, comprising conveying and weighing objects. An appropriate bin for each of the weighed objects is selected, wherein each bin is provided with a weighing means. Accordingly, the total portion weight is periodically registered. By means of comparing the potion weight with the summed object weight in that portions, an appropriate bin can be selected for forthcoming objects.

10 Claims, 1 Drawing Sheet

BATCHING WITH FEEDBACK CORRECTION

This application is the U.S. national phase of international application PCT/IS03/00008 filed on 13 Feb. 2003, which designated the U.S. and claims priority to IS Application No. 6268 filed 13 Feb. 2002. The entire contents of these applications are incorporated herein by reference.

FIELD OF THE INVENTION

The present invention relates to a method and an apparatus for automatically batching objects into portions with a feedback correction.

BACKGROUND

In various industries, basic objects are sold in batches satisfying various constraints. For example, many food objects, such as fresh or frozen fish portions, chicken portions or meat portions, are sold in prepackaged batches having a predetermined weight and/or number of pieces, within given tolerance. The tolerances may be quite strict in some industries.

In the contracts between sellers and purchasers for delivery of products must satisfy minimum weight or other requirements. It is important that none of the collections is below minimum weight, but exceeding the weight results in an economical loss for the manufacturer.

The typical way to build up portions of objects is to weight each object prior to selecting the appropriate portion that is building up this particular object, where the weight of each portion is simply the sum of each individual object In that portion. If all the portions are far from the final weight limit, it is not essential which of these portions will be chosen for this object. If however the weight of one or more portions is closed to the final weight limit, it is essential which portion, for this particular object, will be chosen.

GB A 2.115.630 describes system for portion weighing of material wherein an automatic feedback correction is Introduced to correct the weighing difference between continues weighing and stationary weighing. U.S. A 3,945,448 describe similar system. As discussed hereinafter there is the fundamental difference between those prior systems, which do not allow selection of objects to be directed into preferred bin according to its first weight as well as corrected weighing for prior items already directed to a plurality of bins.

The problem with prior art methods is the inaccuracy in the weight of each portion that is building up, which can change the precondition when selecting an appropriate objects into a portion, so that the overweight of that portion is minimized. Where the weight of one portion is based on the sum of each object in the portion, the error in the weight of the total portion is the sum of errors in of each individual object. This can be related to the resolution in the weighing means that are being used. As an example the resolution in a weighing means is 1 g. This means that the error in weighing a single object is up to 1 g. If the number of objects in one portion is 20, the maximum error is number of objects multiplied with the resolution (error) for one single object, or 20*2 g=40 g. However, by registering the weight of the total portion by a single weighing procedure this error is dramatically reduced, and would in this particular example be 1 *1 g=1 g.

DESCRIPTION OF THE INVENTION

It is an object of the present invention to provide an apparatus and a method for reducing this error by registering the weight the total portion that is building up, instead of relying on the sum of weights of each individual object. The portion weight can therefore be used for re-estimating physical characteristic for use with future weighing data. Thereby the error is reduced dramatically in the weighing procedure.

According to the first aspect, the present invention relates to a method for automatically batching objects into portions, comprising:

conveying a present object to be weighed, weighing said present object to be graded and sending output signals representative of the weighing data, selecting an appropriate bin for said weighed object where a portion of at least one object is formed, directing said object to said bin, weighing said portion periodically and sending output signals representative of the weighing data, comparing said portion weight periodically with the summed object weight in said bin, and utilizing a plurality of such comparisons for selecting an appropriate bin for forthcoming objects and thereby increasing weighing accuracy in the bin.

Preferably comparing the portion weight with the summed object weight comprises determining the difference there between. If the difference exceeds a predetermined limit the weighing of objects may be corrected, with the aim of minimizing the later determined differences between the portion weight and the summed object weight. A difference there between can also Indicate a whether a particular items has been replaces in not selected bin for that particular item. Selecting an appropriate bin for said weighed object is base on statistical method, but is not essential here. Selecting an appropriate bin for said weighed object may also comprise generating at least one portion until an upper weight limit below a target weight limit is reached and subsequently selecting an appropriate object with the aim of minimizing the overweight.

In another aspect, the present invention relates to an apparatus for automatic grading of objects into portions, comprising:

a conveyor for conveying the objects;

a first weighing equipment for weighing the object to be graded as the object is conveyed on said conveyor, said weighing equipment sending output signals representative of the weighing data;

means for determining an appropriate bin for said weighed object where a portion of at least one object is formed, a second weighing equipment for weighing a portion weight of said objects in at least one bin, said weighing equipment sending output signals representative of the weighing data;

a computer system utilizing said output signals representative of said weight data for comparing said portion weight periodically with the summed object weight in said bin, and said computer system utilizing a plurality of such comparisons for selecting an appropriate bin for forthcoming objects.

Preferably the first weighing equipment is a dynamic scale and the second weighting equipment is a static scale. The present invention also provides a method in claims 1-6.

DETAILED DESCRIPTION

The above and other objects and advantages of the invention will be apparent upon consideration of the following detailed description, taken in conjunction with the accompanying drawing.

Figure 1:
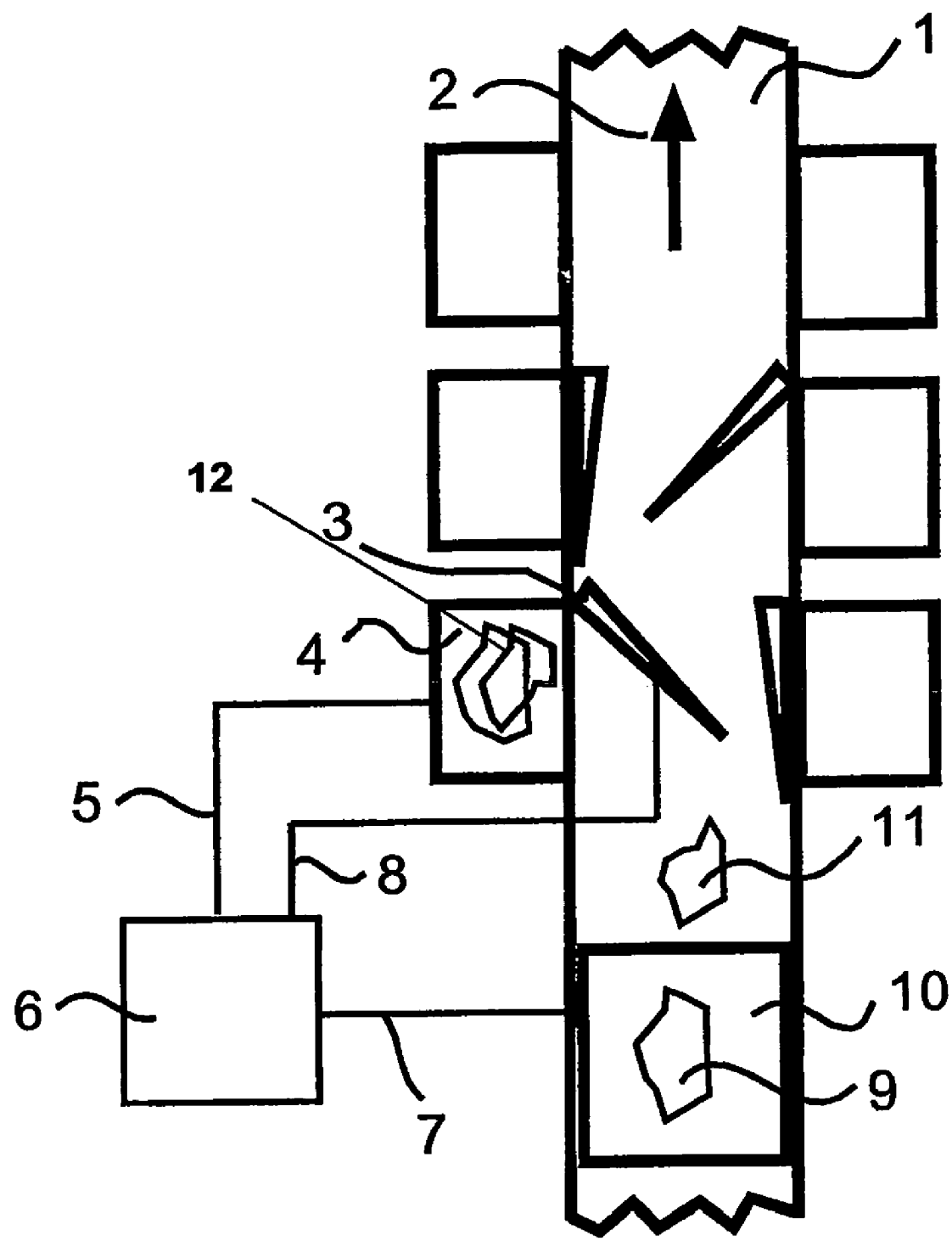
FIG. 1 shows one embodiment of an apparatus for batching objects using portion weight to correct the actual object weight. In this embodiment the objects 9 are weighed on a weighing means 10, such as a dynamic scale. A weighing signal is directed to the computer system 6. Based upon the weighing of the particular object, previously weighed objects as well as information obtained about the accumulated weighing 12 in the bin and weighing criteria such as maximum overweight, the objects are accordingly directed them into a bin. The conveyor 1 with arm devices 3 is associated to appropriate bins 4. The decision of selecting the appropriate bin may 4 be based on any known methods for example such as statistical methods. This is however not the essential part of the present invention. The essential feature here is the weighing means that is provided for weighing the portion in each of the bins 4. This reduces the error dramatically wherein the resolution in the weighing means is usually based on resolution error. This may be explained further in the following example: The weigh of one object is (22 ±1) g, wherein due to the resolution In the weighing means the error is 1 g. If the portion weight consists of 5 pieces, 22 g, 23 g, 19 g, 20 g and 25 g, the total weight is (109 ±5) g, wherein 5 g is the total error. Accordingly, the total error in the weight measurement is the sum of the error for each individual object. If on the other hand the whole portion as such is weighed such multiple error in the weight measurement does not occur, and the error is only be 1 g. Also, such weighing means for each bin may be a static scale, which are usually more accurate than dynamic scales.

In the embodiment in FIG. 1, a plurality of objects 9, 11 are conveyed with a conveyor belt 1 in a direction indicated by the arrow 2. Each object is weighed and the information are stored in a computer system 6. This computer system 6 receives also information regarding the portion weight 5 periodically, so at any instant of time the actual portion weight is known, and compares this portion weight with the total weight that would be obtained by summing the weight of each individual object in this particular portion 4. From the portion weights 5 and the object weight 7 the computer system transfers the object with a directing arms 3 into the appropriate bin. However, a difference between the portion weight 5 and the summed target weight between may be due to the larger error occurring in summing up the individual object. This error may also be due to failures in directing the objects into the right bin. If such failure would occur, it would be registered Instantly and appropriate arrangement could be made. If the difference is small, which could be due to errors in the dynamic scale 10 a correction procedure in the scale could be done, until the difference between the portion weight 5 the summed weight of each individual objects is minimized.

Assuming that no failures occur, and assuming that all the bins are empty, then the correction could be done in the following way:

An object nr.1 is weighed on the dynamic scale and has the value w1 and is put into bin 4, where the static scale weighs said object. This weight of the bin (with only one object) is compared to the weight from the dynamic scale. If the difference is very small, no correction In the static scale is necessary. An object nr. 5 is at some later time weighed with the dynamic scale and has the value w5 is put into the same bin 4. The computer system compared now compare the portion value portion=(w1+w2) with the summed value sum=w1+w2. If again the difference portion—sum is within some predetermined limit, no correction in the dynamic scale is made. If on the other hand this difference exceeds said predetermined limit, the dynamic scale is corrected. Again this procedure is repeated and again the correction if necessary.

In another preferred embodiment, the batching may be based on filling portions 4 up to a predetermined limit, which Is under a target weight limit. Again the computer systems registers frequently the portion weight 5 and signals when the portion weight it is close to the target weight limit. Thereafter, an appropriate object that has been weighed on the dynamic scale is chosen for that particular bin so that the overweight (the weight exceeding the target weight) is minimized.

The invention claimed is:

1. A method for automatically batching objects into portions, comprising:
   conveying a present object to be weighed,
   weighing said present object to be graded and sending output signals representative of weighing data for the present object,
   selecting an appropriate bin for said weighed object where a portion of at least one object is formed,
   directing said object to said bin,
   weighing said portion periodically and sending output signals representative of weighing data for the portion,
   comparing said portion's weight periodically with a summed object weight in said bin, and
   utilizing a plurality of such comparisons for selecting an appropriate bin for forthcoming objects and thereby increasing weighing accuracy in the bin.

2. The method according to claim 1, wherein comparing the portion weight with the summed object weight comprises determining the difference there between.

3. The method according to claim 2, wherein if the difference exceeds a predetermined limit the weighing of objects is corrected with the aim of minimizing the later determined differences between the portion weight and the summed object weight.

4. The method according to claim 1, wherein the difference between the portion weight and the summed object weight is used for determining if a particular item has been replaced in a non-selected bin for that particular item.

5. The method according to claim 1, wherein selecting an appropriate bin for said weighed object is based on statistical methods.

6. The method according to claim 1, wherein selecting an appropriate bin for said weighed object comprises generating at least one portion until an upper weight limit below a target weight limit is reached and subsequently selecting an appropriate object with the aim of minimizing the amount of weight over the weight limit.

7. An apparatus for automatic grading of objects into portions, comprising:
   a conveyor for conveying the objects,
   a first weighing equipment for weighing the object to be graded as the object is conveyed on said conveyor, said weighing equipment sending output signals representative of weighing data for the object to be graded,
   means for determining an appropriate bin for said weighed object where a portion of at least one object is formed,
   a second weighing equipment for weighing a portion weight of said objects in at least one bin, said weighing equipment sending output signals representative of weighing data for said portion weight,
   a computer system utilizing said output signals representative of said weight data for comparing said portion weight periodically with a summed object weight in said bin, and
   said computer system utilizing a plurality of such comparisons for selecting an appropriate bin for forthcoming objects and thereby increasing weighing accuracy in the bin.

8. The apparatus according to claim 7, wherein the first weighing equipment is a dynamic scale.

9. The apparatus according to claim 7, wherein the second weighing equipment is a static scale.

10. The apparatus according to claim 7, for performing the method in claim 1.

* * * * *